March 27, 1928.
J. M. LORENZ
1,664,124
GLARE SHIELD
Filed May 10, 1926
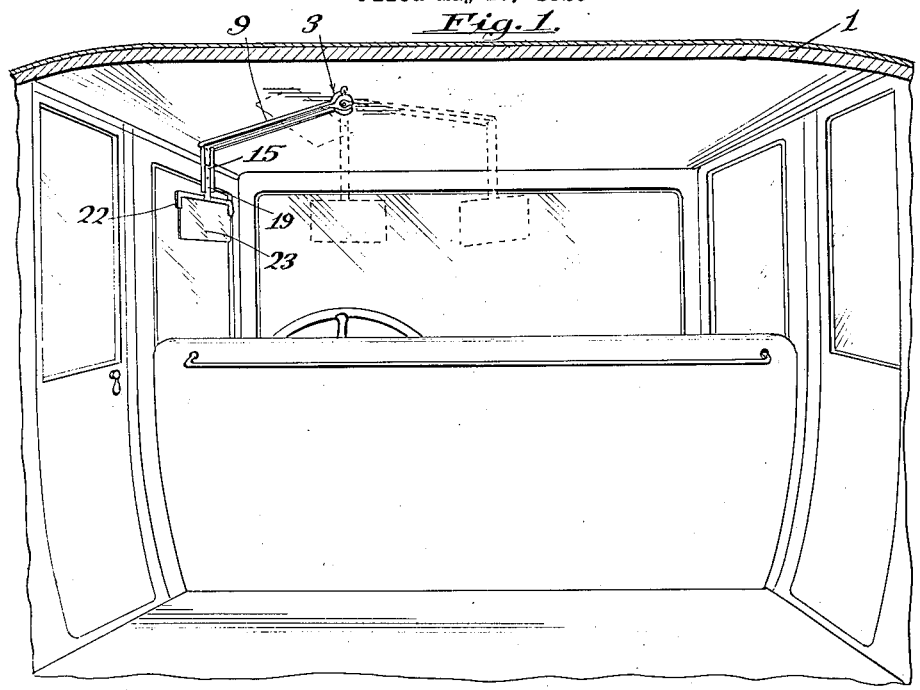
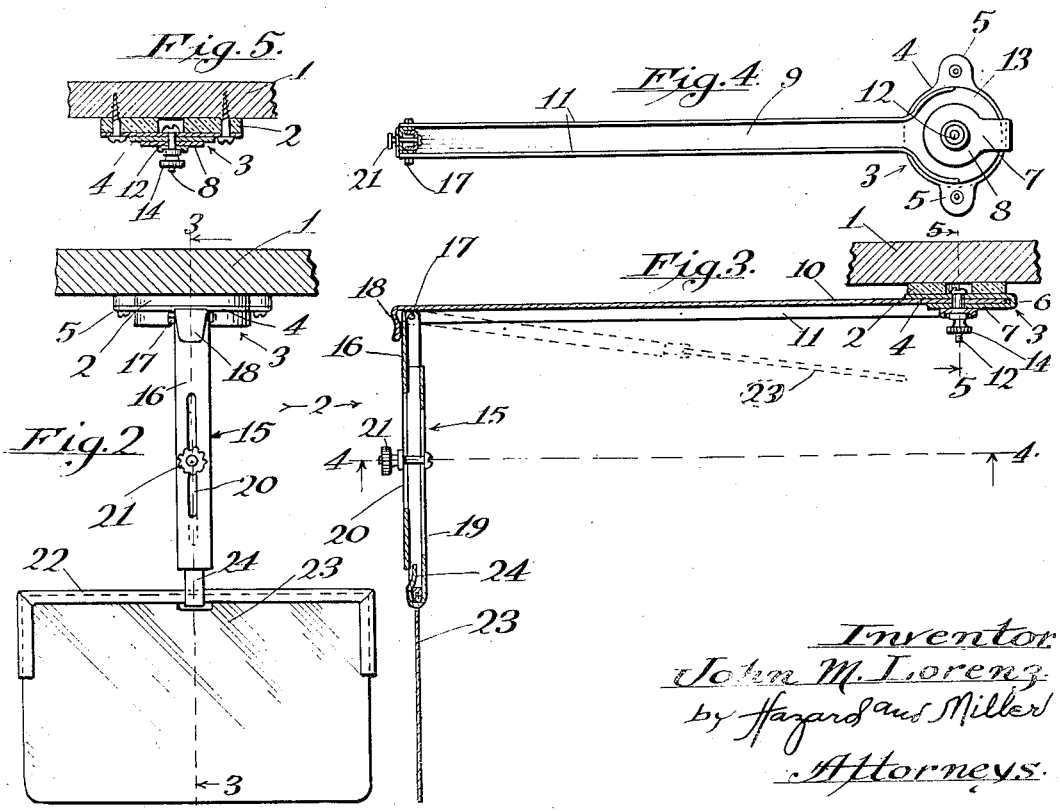
Inventor
John M. Lorenz
by Hazard and Miller
Attorneys.

Patented Mar. 27, 1928.

1,664,124

UNITED STATES PATENT OFFICE.

JOHN M. LORENZ, OF LOS ANGELES, CALIFORNIA.

GLARE SHIELD.

Application filed May 10, 1926. Serial No. 107,979.

My invention is a glare shield, particularly adapted for use in closed automobiles or the like.

An object of my invention is the construction of a glare shield particularly adapted for enclosed automobiles, mounted in the roof of the vehicle above the driver's seat, and having a colored transparent screen which may be shifted to different positions in order to eliminate the glare, that is, the screen or shield may be positioned on either side of the driver or in the front, and is constructed to swing on a pivot point which would be substantially over the driver's seat, there being a horizontal arm from which the screen or shield depends.

A further object of my invention is to form a glare shield, the supporting frame of which may be attached to a central pivotal point in the roof of an automobile over the driver's seat, and having a horizontal arm connected to the pivot and with folding telescopic arms which may hang vertically downwardly from the horizontal arm, thus supporting the screen or shield at any desired elevation, and allowing swinging same into any position horizontally.

Another object of my invention is a glare shield which may be folded up against the inside of the top of a vehicle or pulled downwardly into position therewith.

My glare shield comprises in brief a clamping bracket which may be attached to the roof of a vehicle, a horizontal supporting arm pivoted in said bracket, a hinged depending arm attached to the end of the bracket to fold upwardly thereagainst, so that the shield may be folded up against the roof of the vehicle. The depending arm is formed telescopically and has a transparent colored screen attached at the lower end thereof.

My invention will be more readily understood from the following description and drawings, in which;

Figure 1 is a perspective view of the interior of a closed automobile, with my glare shield suspended from the roof;

Fig. 2 is an elevation of my shield when in depending position, as if taken in the direction of the arrow 2 of Fig. 3;

Fig. 3 is a longitudinal section taken on the line 3—3 of Fig. 2, in the direction of the arrows;

Fig. 4 is a horizontal section on the line 4—4 of Fig. 3, taken in the direction of the arrows, showing a section through the depending arms and an underneath view of the main supporting arm;

Fig. 5 is a detail vertical section on the line 5—5 of Fig. 3, through the clamping bracket and pintle.

The roof or top structure of a vehicle is indicated by the numeral 1 to which is attached a disc 2 or the like; my clamping bracket 3 being secured to such disc. This clamping bracket has a base 4 with lugs 5 thereon, these lugs having apertures for holding screws or the like. The bracket as a whole is preferably made of sheet metal having a reverse bend 6 on one end and an arm 7 extending over the top of the bracket with a plate 8 terminating the arm. A supporting arm 9 constructed channel-shaped has a web 10 and flanges 11, the web extending between the base and the arm 7 and plate 8 of the clamping bracket.

A pinion bolt 12 extends through the clamping bracket and through the terminal end 13 of the arm 9 and by means of the clamp nut 14 a sufficient friction may be exerted between the clamping bracket and the terminal end of the arm 9 to hold same in any adjusted position horizontally, that is, the nut would preferably be tightened so that the arm may be swung in different positions and will remain in such position.

The depending rod 15 is formed telescopically, having a channel 16 pivoted to the arm 9 by means of a hinging pin 17 which passes through the flanges of these two channels. A stop flange 18 is formed on the arm 9 by extending the web thereof and bending same downwardly as shown in Fig. 3. The lower part 19 of the depending rod is also formed from a channel, being fitted in the channel 16. Either or both of these channels is provided with a slot 20 and has a clamping bolt 21 joining the upper and lower parts of the depending rod so that they may be adjusted telescopically to lengthen or shorten such rod.

A screen holder 22 is formed of preferably thin sheet metal, bent into the form of a close channel in which the screen or shield 23 is secured by one edge. This channel is clamped tight on the screen and holds same in place. The screen has an aperture 23 through which extends a tongue 24, this tongue being the web of the lower channel 19 which extends around the holder 22 and is bent upwardly as shown in Fig. 3.

The manner of adjusting and using my glare shield is substantially as follows:

As above described, it will be understood that the nut 14 may be tightened so that the arm 9 will remain in any position in which it is swung, this arm fitting close against the top of the vehicle as indicated in Fig. 1. The depending rod 15 has a type of hinge 17 which may be tightened so that when the said rod is shoved upwardly as indicated by the dotted line in Fig. 3, that there will be sufficient friction between the flanges of the channels 9 and the channel structure of the depending rod, to hold same with the screen or shield in an upper position, close to the roof of the vehicle as indicated in dotted lines in Figs. 1 and 3. The elevation of the screen may also be adjusted by the telescopic arrangement of the depending rod 15.

It will therefore readily be seen as illustrated in Fig. 1, that the shield may be placed on different sides of the driver or between the driver and the windshield. Thus the device may readily be shifted to cut out out any particular glare which may be bothering the driver. This may be from sunlight through the side windows, the lights from approaching automobiles at night, or any other type of glare and as the device may be shifted quickly to any desired position, the driver may adjust the screen without stopping the vehicle.

Although my glare shield is a comparatively simple structure, it will nevertheless be apparent that it may be changed considerably in general construction and in specific details to suit different circumstances. Such changes however, would be within the spirit of my invention as set forth in the description, drawings and claims.

Having described my invention, what I claim is:

1. A glare shield comprising in combination a clamping bracket, means to secure said bracket to the roof of a vehicle, a horizontal channel-shaped arm pivoted to said bracket by a vertical clamping bolt, a depending rod hinged to the free end of said channel, whereby the rod may be swung upwardly and substantially housed within said channel, a screen holder connected to the lower end of the rod, and a screen in said holder.

2. A glare shield as claimed in claim 1, said clamping bracket being provided with a base and a cover plate connected by an arm having a reverse bend, whereby a frictional bearing may be had between the bracket and the arm.

In testimony whereof I have signed my name to this specification.

JOHN M. LORENZ.